United States Patent [19]

Robeson et al.

[11] 4,250,279

[45] Feb. 10, 1981

[54] POLYARYLATE BLENDS WITH POLYETHERIMIDES

[75] Inventors: Lloyd M. Robeson, Whitehouse Station; Markus Matzner, Edison; Louis M. Maresca, Belle Mead, all of N.J.

[73] Assignee: Union Carbide Corporation, New York, N.Y.

[21] Appl. No.: 106,504

[22] Filed: Dec. 26, 1979

[51] Int. Cl.³ .................. C08L 67/02; C08L 79/08
[52] U.S. Cl. ............................ 525/425; 528/176; 528/194; 525/420; 525/433; 525/905; 525/928
[58] Field of Search ............... 525/425; 528/176, 177, 528/194

[56] References Cited

U.S. PATENT DOCUMENTS

| | | | |
|---|---|---|---|
| 4,052,481 | 10/1977 | Asahara | 525/425 |
| 4,141,927 | 2/1979 | White | 260/857 PA |
| 4,171,330 | 10/1979 | Kyo | 525/425 |

FOREIGN PATENT DOCUMENTS 50-04146  1/1975  Japan ........................................ 525/425

Primary Examiner—Paul Lieberman
Attorney, Agent, or Firm—Donald M. Papuga

[57] ABSTRACT

Described herein are molding compositions of blends of a polyarylate derived from a dihydric phenol and an aromatic dicarboxylic acid, and a polyetherimide. These blends can additionally contain thermoplastic polymers which are compatible with the blend of polyarylate and polyetherimide.

20 Claims, No Drawings

POLYARYLATE BLENDS WITH POLYETHERIMIDES

BACKGROUND OF THE INVENTION

This invention is directed to molding compositions comprising blends of a polyarylate derived from a dihydric phenol and a dicarboxylic acid, and a polyetherimide. The compositions can also contain thermoplastic polymers compatible with the blends of polyarylate and polyetherimide.

Polyarylates are aromatic polyesters derived from a dihydric phenol, particularly 2,2-bis-(4-hydroxyphenyl)propane (also identified as Bisphenol-A) and an aromatic dicarboxylic acid, particularly mixtures of terephthalic and isophthalic acids.

Polyarylates are high temperature, high performance thermoplastic polymers with a good combination of thermal and mechanical properties. They have a high continuous use temperature of about 130° C., and good unnotched toughness, with a pendulum impact value of greater than 300 ft. lbs./in.$^3$. Additionally, polyarylates have inherent flammability and combustion resistance as well as good weather-ability. The polyarylates have good melt stability at high temperatures and good color retention. They also have good processability which allows them to be molded into a variety of articles.

However, when polyarylates are placed in a solvent environment they readily stress crack so that stress crack resistance of polyarylates is not as high as those of crystalline thermoplastic polymers.

Thus, it is desirable to increase the environmental stress crack resistance of polyarylates to make them more acceptable for use in a solvent environment without essentially effecting the other mechanical properties of the polyarylates.

It has now been unexpectedly found that the addition of a polyetherimide to a polyarylate yields compositions which have significantly improved environmental stress crack resistance. Also, the compositions containing polyetherimide and polyarylate have excellent mechanical compatibility over the entire range and have excellent mechanical properties. Further, addition of the polyarylate to the polyetherimide results in improved impact strength of the polyetherimide.

Additionally, it has been found that when a thermoplastic polymer which is compatible with the blend of polyarylate and polyetherimide is added to said blend, the resulting blends possess an acceptable balance of mechanical properties.

DESCRIPTION OF THE INVENTION

The molding composition of this invention comprises a blend of:
(a) a polyarylate derived from a dihydric phenol and an aromatic dicarboxylic acid;
(b) a polyetherimide; and optionally,
(c) a thermoplastic polymer compatible with the blend of polyarylate and polyetherimide.

The polyarylates of this invention are derived from a dihydric phenol and an aromatic dicarboxylic acid.

A particularly desirable dihydric phenol is of the following formula:

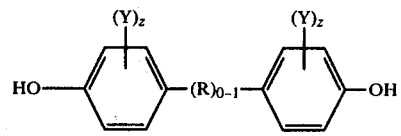

wherein Y is independently selected from alkyl groups of 1 to 6 carbon atoms, cycloalkyl groups of 6 to 12 carbon atoms, aryl groups of 6 to 20 carbon atoms, chlorine or bromine, z has a value of from 0 to 4, inclusive, and R is a divalent saturated aliphatic or aromatic hydrocarbon radical, particularly alkylene and alkylidene radicals having from 1 to 8 carbon atoms, cycloalkylene and cycloalkylidene radicals having up to and including 9 carbon atoms, and arylene radicals having from 6 to 20 carbon atoms.

The dihydric phenols that may be used in this invention include the following:
2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
1,4-(4,4 dihydroxydiphenyl)benzene,
4,4'-(dihydroxydiphenyl)ether,
4,4'-(dihydroxydiphenyl)sulfide,
4,4'-(dihydroxydiphenyl)sulfone,
4,4'-(dihydroxydiphenyl)sulfoxide,
4,4'-dihydroxybenzophenone,
4,4'-dihydroxybiphenyl naphthalene diols, and the like.

These dihydric phenols may be used individually or in any combination. The preferred dihydric phenol is 2,2-bis(4-hydroxyphenyl)propane.

Additionally, said dihydric phenols can be used in combination with a dihydric phenol of the following formula:

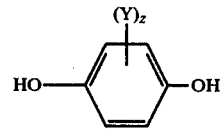

wherein Y and z are as previously defined.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, the ratio of isophthalic and terephthalic acids in the mixture is about 20:80 to about 100:0, while the most preferred acid ratio is about 25:75 to about 75:25. Also, from about 0.5 to about 20 percent of aliphatic diacids containing from 2 to about 20 carbon atoms, such as adipic acid, sebacic acid, and the like, may be additionally used in the polymerization reaction.

Any known polyester forming reaction can be used to make the polyarylates, such as:

(1) The reaction of the acid chlorides of the dicarboxylic acids with the diphenols.

(2) The reaction of the aromatic diacid(s) with diester derivatives of the diphenol

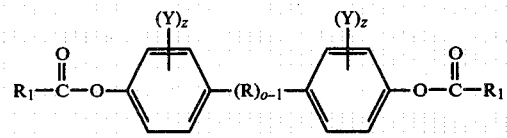

where $R_1$ is alkyl containing 1 to 20 carbon atoms, preferably methyl and Y, z, and R are as previously defined (hereinafter referred to as the Diacetate Process).

(3) The reaction of the diaryl esters of the aromatic diacids with the diphenols, (hereinafter referred to as the Diphenate Process).

Two procedures can be used for the preparation of the polyarylates via the acid chloride route. One is carried out at low temperature and the other at high temperature. In the low temperature technique polycondensation of the acid chlorides derived from the dicarboxylic acid(s) with the dihydric phenol(s) is effected at ambient temperatures in an inert solvent, such as methylene chloride, in the presence of a basic catalyst and an acid acceptor. A second immiscible solvent, e.g., water, may be present. In the high temperature technique, polycondensation of acid chlorides with the dihydric phenols is effected in a high boiling solvent, such as 1,2,4-trichlorobenzene, at temperatures above about 150° C. and preferably at about 200° to about 220° C.

Other suitable inert organic solvents useful for low temperature polycondensation include halogenated aliphatic compounds, such as, chloroform, methylene bromide, 1,1,2-trichloroethane as well as methylene chloride mentioned above and the like; and cyclic ethers such as tetrahydrofuran, dioxane, and the like. For the high temperature polycondensation, suitable solvents include halogenated aromatic compounds such as, o-dichlorobenzene, 1,2,4-trichlorobenzene, diphenyl sulfone, benzoic acid alkyl esters wherein the alkyl group contains 1 to about 12 carbon atoms, phenolic ethers, such as, anisole, diphenyl ether and the like.

Preferred acid acceptors for use in the low temperature polycondensation are alkali metal and alkaline earth hydroxides including sodium, potassium, barium, calcium, strontium, magnesium, and beryllium hydroxide.

Useful basic catalysts for use in the low temperature polycondensation include tertiary amines such as alkylamines, including trimethylamine, triethylamine, tripropylamine, tributylamine, and the like; where the alkyl group contains from 1 to about 10 carbon atoms; alkaryl amines such as, N,N-dimethylaniline, N,N-diethylaniline, N,N-dimethylnaphthylamine, benzyl dimethylamine, alpha-methylbenzyl dimethylamine; pyridine, cyclic diazo compounds, such as, diazobicyclooctane (DABCO), diazo bicyclononene (DBN) and diazobicycloundecene (DBU) and the like. Phosphonium, arsonium and similar compounds may also be used as catalysts.

Polymerizations using the Diacetate Process can be carried out in the melt at between 260° C. and 340° C., preferably between 275° C. and 320° C. They can also be carried out either as a solution reaction at those temperatures or a suspension reaction also at those temperatures. The solvent(s) or suspending agent(s) can be one of any number of organic compounds boiling between 140° C. and 340° C. They can be chosen from hydrocarbons, ketones, ethers, or sulfones which are inert under the reaction conditions. These polymerizations may or may not be run in the presence of a catalyst. Typical solvents are tetramethylene sulfone, diphenyl ether, substituted diphenyl ether, and the like. Typical catalysts include Na, Li, K salts (organic and inorganic), transition metal salts, alkaline earth metal salts, e.g., Mg acetate, and the like. They may be performed at atmospheric pressure, supra atmospheric pressure, or under vacuum.

Polymerizations using the Diphenate Process can be carried out in the melt at between 285° C. and 350° C. The preferred temperature range is about 300° C. to 340° C. In general reduced pressure for the final portions of the reaction is used. They can also be carried out either as a solution reaction or suspension reaction under those conditions. The solvent(s) or suspending agent(s) are the same as those described above. Typical catalyst include tin compounds and generally are those mentioned above for the diacetate process. Particularly preferred catalysts are Ti and Sn salts, Mg acetate, and alkali and alkaline earth metal salts, alkoxides and phenoxides.

These polyarylates have a reduced viscosity of from about 0.4 to about 1.0 as measured in chloroform at 25° C. (0.2 g/100 ml.) or other suitable solvents at suitable temperatures.

The polyetherimides suitable for use in this invention are well known in the art and are described in, for example, U.S. Pat. Nos. 3,847,867, 3,838,097 and 4,107,147.

The polyetherimides are of the following formulae:

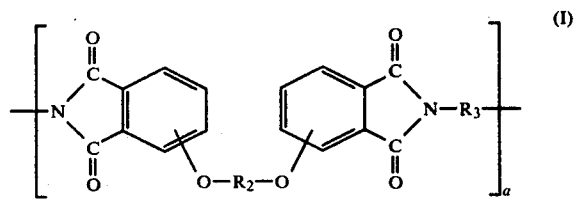

wherein a is an integer greater than 1, preferably from about 10 to about 10,000 or more, $-O-R_2-O-$ is attached to the 3 or 4 and 3' or 4' positions and $R_2$ is selected from (a) a substituted or unsubstituted aromatic radical such as

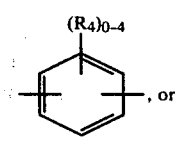

, or

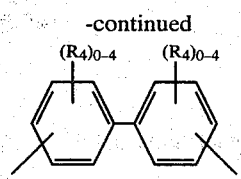

(b) a divalent radical of the formula:

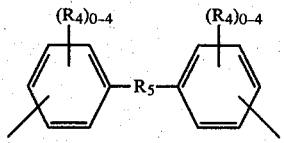

wherein $R_4$ is independently $C_1$ to $C_6$ alkyl, or halogen and $R_5$ is selected from —O—, —S—, $$-\overset{\overset{O}{\|}}{C}-,\ -SO_2-,\ -SO-,$$

alkylene of 1 to 6 carbon atoms, cycloalkylene of 4 to 8 carbon atoms, alkylidene of 1 to 6 carbon atoms or cycloalkylidene of 4 to 8 carbon atoms, $R_3$ is selected from an aromatic hydrocarbon radical having from 6–20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms, $C_2$–$C_8$ alkylene terminated polydiorganosiloxane and a divalent radical of the formula

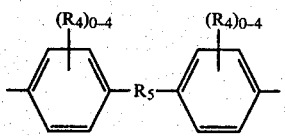

wherein $R_4$ and $R_5$ are as previously defined, and $R_5$ may be a direct bond.

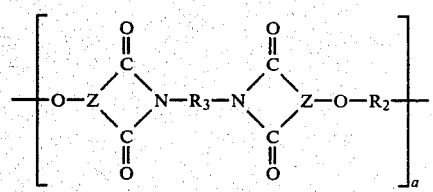   (II)

wherein

is a member selected from

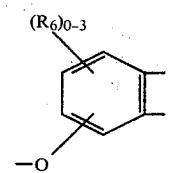   (a)

wherein $R_6$ is independently hydrogen, lower alkyl or lower alkoxy

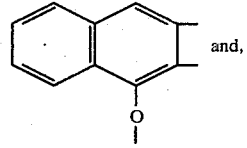 and,   (b)

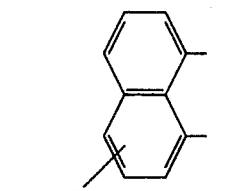   (c)

wherein the oxygen may be attached to either ring and located ortho or para to one of the bonds of the imide carbonyl groups, $R_2$ and $R_3$ and a are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (I) can, for example, be obtained by any of the methods well-known to those skilled in the art including the reaction of any aromatic bis(ether anhydride)s of the formula

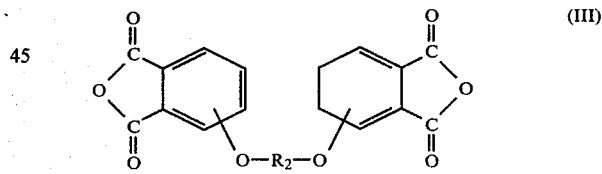   (III)

where $R_2$ is as defined hereinbefore, with a diamino compound of the formula $$H_2N-R_3-NH_2 \qquad (IV)$$

where $R_3$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and the diamines, at temperatures of from about 20° to about 250° C. Alternatively, the polyetherimides can be prepared by melt polymerization of any dianhydride of Formula III with any diamino compound of Formula IV while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally useful polyetherimides of Formula I have an intrinsic viscosity $[\eta]$ greater than 0.2 deciliters per gram, preferably 0.35 to 0.60, or 0.7 deciliters per gram or even higher when measured in m-cresol at 25° C.

The aromatic bis(ether anhydride)s of Formula III include, for example,
2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; etc.
and mixtures of such dianhydrides.

The organic diamines of Formula IV include, for example,
m-phenylenediamine,
p-phenylenediamine,
4,4'-diaminodiphenylpropane,
4,4'-diaminodiphenylmethane, benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine, The polyetherimides of formula (II) may, for example, be prepared by effecting reaction in the presence of a dipolar aprotic solvent of a mixture of ingredients comprising, for instance, (1) a bis(nitrophthalimide) of the general formula:

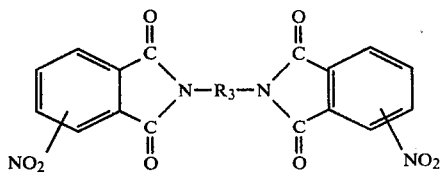

(V)

wherein $R_3$ is defined as hereinabove, and (2) an alkali metal salt of an organic compound of the general formula:

$$MO-R_2-OM \qquad (VI)$$

wherein M is an alkali metal and $R_2$ is defined as hereinabove.

The bis(nitrophthalimide) used in preparing the polymer is formed by reacting a diamine of the formula described above $$NH_2-R_3-NH_2$$

with a nitro-substituted aromatic anhydride of the formula:

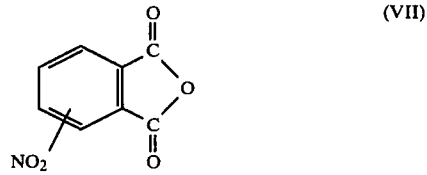

(VII)

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalenedicarboxylic anhydride and 3-methoxy-6-nitrophthalic anhydride, and the like.

With reference to the alkali metal salts of formula VI among the divalent carbocyclic aromatic radicals which $R_2$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g. hydroquinone, resorcinol, chlorohydroquinone, etc. In addition, $R_2$ may be a residue of a dihydroxy diarylene compound in which the aryl nuclei are joined by either an aliphatic group, a sulfoxide group, sulfonyl group, sulfur, carbonyl group, oxygen, the $-C(CH_3)(CH_2)_2(COOH)$ group, etc. Typical of such diarylene compounds are the following:
2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;

2,2-bis(4-hydroxynaphthyl)propane;
hydroquinone;

The preferred polyetherimides include those of the formula:

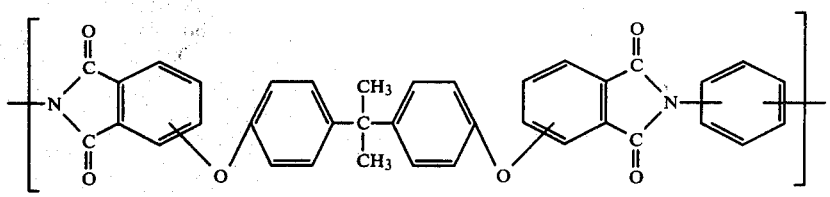

naphthalene diols;
bis(4-hydroxyphenyl)ether;
bis(4-hydroxyphenyl)sulfide;
bis(4-hydroxyphenyl)sulfone; and the like.

When dialkali metal salts of formula VI are used with the compound illustrated by formula V, the ingredients are advantageously present in an equal molar ratio for optimum molecular weight and properties of the polymer. Slight molar excesses, e.g., about 0.001 to 0.10 molar excess of either the dinitro-substituted organic compound or of the dialkali metal salt of formula may be employed. When the molar ratios are approximately equal, the polymer is substantially terminated by a =Z—NO₂ at one end and a a phenolic group at the other end. If there is a molar excess of one compound, that particular terminal group will predominate.

The conditions of reaction whereby the alkali-metal salt of formula IV is reacted with the dinitro-substituted organic compound of formula III can be varied widely. Generally, temperatures of the order of about 25°–150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed as precipitants for this purpose.

It is important that the reaction between the dinitrosubstituted organic compound of formula III and the alkalimetal salt of formula IV (mixtures of such alkalimetal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10–20% by weight of polymer is preferably employed.

The thermoplastic polymers which are compatible with the blend of polyarylate and polyetherimide include, polyesters, polycarbonates and poly(aryl ether)s.

The polyesters which are suitable for use herein are derived from an aliphatic or cycloaliphatic diol or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

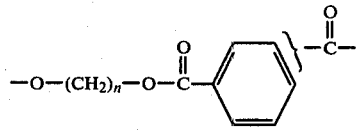

wherein n is an integer of from 2 to 4.

The preferred polyesters are poly(ethylene terephthalate) and poly(1,4-butylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to and above about 50 carbon atoms, including cycloaliphatic straight and branched chain acids, such as adipic acid, cyclohexanediacetic acid, dimerized $C_{16}$–$C_{18}$ unsaturated acids (which have 32 to 36 carbon atoms), trimerized acids, and the like.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid so as to produce a polyester having recurring units having the following formula:

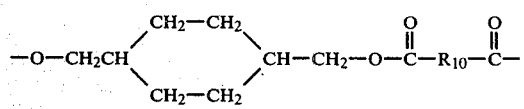

wherein the 1,4-cyclohexane dimethanol is selected from the cis- and trans-isomers thereof and $R_{10}$ represents an aryl radical containing 6 to 20 carbon atoms and which is the decarboxylated residue derived from an aromatic dicarboxylic acid.

Examples of aromatic dicarboxylic acids indicated by $R_{10}$ in the formula above include isophthalic or terephthalic acid, 1,2-di(p-carboxyphenyl)ethane, 4,4′-dicarboxydiphenyl ether, etc., and mixtures of these. All of these acids contain at least one aromatic nucleus. Fused rings can also be present such as in 1,4- or 1,5-naphthalene-dicarboxylic acids. The preferred dicarboxylic acid is terephthalic acid or mixtures of terephthalic and isophthalic acid.

A preferred polyester may be derived from the reaction of either the cis- or trans-isomer (or a mixture thereof) of 1,4-cyclohexanedimethanol with a mixture of iso- and terephthalic acids. These polyesters have repeating units of the formula:

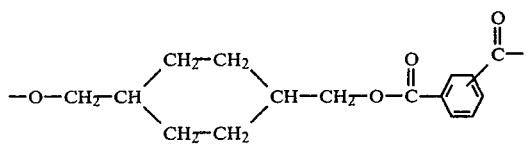

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

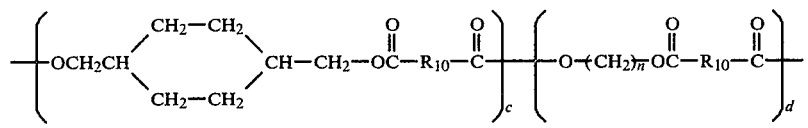

wherein the 1,4-cyclohexane dimethanol is selected from the cis- and trans-isomers thereof, $R_{10}$ is as previously defined, n is an integer of 2 to 4, the c units comprise from about 10 to about 90 percent by weight, and the d units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in, for example, a molar ratio of 1:2:3. These copolyesters have repeating units of the following formula:

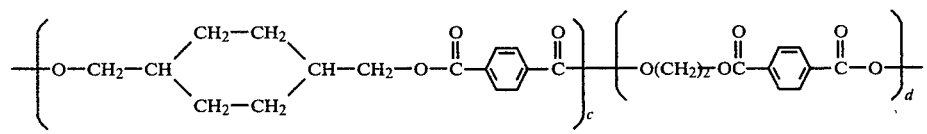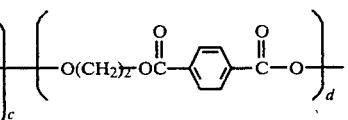

wherein c and d are as previously defined.

The polyesters as described herein are either commercially available or can be produced by methods well known in the art such as those set forth in, for example, U.S. Pat. No. 2,901,466.

The preferred polyesters are poly(1,4-cyclohexanedimethanol tere/iso-phthalate) and a copolyester of 1,4-cyclohexanedimethanol, ethylene glycol and terephthalic acid and poly(ethylene terephthalate) as previously described.

The polyesters used herein have an intrinsic viscosity of at least about 0.4 to about 2.0 dl/g. measured in a 60:40 phenol/tetrachloroethane mixture or similar solvent at 23°–30° C.

The thermoplastic aromatic polycarbonates that can be employed herein are homopolymers and copolymers and mixtures thereof which have an intrinsic viscosity of 0.40 to 1.0 dl./g. as measured in methylene chloride at 25° C. that are prepared by reacting a dihydric phenol with a carbonate precursor. Typical of some of the dihydric phenols that may be employed in the practice of this invention are (2,2-bis(4-hydroxyphenyl)propane), bis(4-hydroxyphenyl) methane, 2,2-bis(4-hydroxy-3-methylphenyl) propane, 4,4-bis(4-hydroxyphenyl)heptane, 2,2-(3,5,3′,5′-tetrachloro-4,4′-dihydroxydiphenyl)propane, 2,2-(3,5,3′,5′-tetrabromo-4,4′-dihydroxydiphenyl)-propane, (3,3′-dichloro-4,4′-dihydroxydiphenyl)methane. Other dihydric phenols of the bisphenol type are also useful and are disclosed in U.S. Pat. Nos. 2,999,835, 3,028,365 and 3,334,154.

It is, of course, possible to employ two or more different dihydric phenols or a mixture of a dihydric phenol with a glycol or with hydroxy or acid terminated polyester, or with a dibasic acid in the event a carbonate copolymer or inter-polymer rather than a homopolymer is desired for use in the preparation of the aromatic carbonate polymers of this invention.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bis-haloformates of dihydric phenols (for example, bischloroformates of bisphenol-A, of hydroquinone, etc.) or glycols (for example, bishaloformates of ethylene glycol, neopentyl glycol, polyethylene glycol, etc.). While other carbonate precursors will occur to those skilled in the art, carbonyl chloride, also known as phosgene, is preferred.

The aromatic carbonate polymers of this invention may be prepared by using phosgene or a haloformate and by employing a molecular weight regulator, an acid acceptor and a catalyst. The molecular weight regulators which can be employed in carrying out the process of this invention include monohydric phenols such as phenol, para-tertiarybutylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, or a bicarbonate, of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonates can be prepared in a one-phase (homogeneous solution) or two-phase (interfacial) systems when phosgene or a haloformate are used. Bulk reactions are possible with the diarylcarbonate precursors.

The poly(aryl ether) resin may be described as a linear thermoplastic polyarylene polyether wherein the arylene units are interspersed with ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage, i.e., —SO$_2$— or —CO—, between arylene groupings, to provide sulfone or ketone units in the polymer chain in addition to arylene units and ether units. The polymer has a basic structure composed of recurring units of the formula

O—E—O—E'— wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in U.S. Pat. No. 3,264,536, the disclosure of which is hereby incorporated herein by reference, for the purpose of describing and exemplifying E and E' in more detail. It is preferred that the dihydric phenol be a weakly acidic dinuclear phenol such as, for example, the dihydroxy diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or the chlorinated derivatives containing one or two chlorines on each aromatic ring. While these halogenated bisphenolic alkanes are more acidic than the non-halogenated bisphenols and hence slower reacting in this process, they do impart valuable flame resistance to these polymers. Other materials also termed appropriately "bisphenols" are also highly valuable and preferred. These materials are the bisphenols of a symmetrical or unsymmetrical joining group, as, for example, ether oxygen (—O—), carbonyl

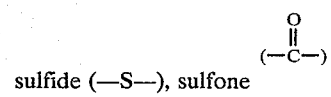

sulfide (—S—), sulfone

or hydrocarbon residue in which the two phenolic nuclei are joined to the same or different carbon atoms of the residue.

Such dinuclear phenols can be characterized as having the structure:

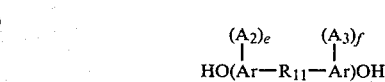

wherein Ar is an aromatic group and preferably is a phenylene group, A$_2$ and A$_3$ can be the same or different inert substituent groups as alkyl groups having from 1 to 4 carbon atoms, halogen atoms, i.e. fluorine, chlorine, bromine or iodine, or alkoxy atoms, i.e. fluorine, chlorine, bromine or iodine, or alkoxy radicals having from 1 to 4 carbon atoms, e and f are integers having a value from 0 to 4, inclusive, and R$_{11}$ is representative of a bond between aromatic carbon atoms as in dihydroxydiphenyl, or is a divalent radical, including for example,

—O—, —S—, —SO—, —S—S, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and a ring fused to both Ar groups.

Examples of specific dihydric polynuclear phenols include among others: the bis-(hydroxylphenyl)alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2,-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl)1,1,1,3,3,3,-hexafluoropropane and the like;

di(hydroxyphenyl)sulfones such as bis-(4-hydroxyphenyl) sulfone, 2,4'-dihydroxydiphenyl sulfone, 5'-chloro-2,4'-dihydroxydiphenyl sulfone, 5'-chloro-4,4'-dihydroxydiphenyl sulfone, and the like.

di(hydroxyphenyl) ethers such as bis-(4-hydroxyphenyl)ether, the 4,3'-, 4,2'-, 2,2'-, 2,3'-, dihydroxydiphenyl ethers, 4,4'-dihydroxy-2,6-dimethyldiphenyl ether, bis-(4-hydroxy-3-isobutylphenyl) ether, bis-(4-hydroxy-3-isopropylphenyl ether, bis-(4-hydroxy-3-chlorophenyl) ether, bis-(4-hydroxy-3-fluophenyl) ether, bis-(4-hydroxy-3-bromophenyl) ether, bis-(4-hydroxynaphthyl) ether, bis-(4-hydroxy-3-chloronapthyl) ether, 4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro-group. The dihalobenzenoid or dinitrobenzenoid compound can be either mononuclear where the halogens or nitro-groups are attached to the same benzenoid ring or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

Any electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev. 49 273 (1951) and Quart. Rev., 12, 1 (1958). See also Taft, *Steric Effects in Organic Chemistry*, John Wiley & Sons (1956), chapter 13; *Chem. Rev.*, 53, 222; JACS 74, 3120; and *JACS*, 75, 4231.

The activating group can be basically either of two types:

(a) monovalent groups that activate one or more halogens or nitro-groups on the same ring as another nitro group, phenylsulfone, or alkylsulfone, cyano, trifluoromethyl, nitroso, and hetero nitrogen as in pyridine.

(b) divalent group which can activate displacement of halogens on two different rings, such as the sulfone group

the carbonyl group

the vinylene group

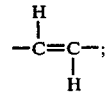

the sulfoxide group

the azo-group —N=N—; the saturated fluorocarbon groups —CF$_2$CF$_2$—; organic phosphine oxides

where R$_{12}$ is a hydrocarbon group, and the ethylidene group

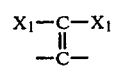

where X$_1$ can be hydrogen or halogen and activating groups within the nucleus which can activate halogens or nitro functions on the same ring such as in the case with difluorobenzoquinone, 1,4- or 1,5- or 1,8-difluoroanthraquinone, etc.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen or nitro group on the benzenoid nucleus.

The polyarylene polyethers of this invention are prepared by method well known in the art as the substantially equimolar one-step reaction of a double alkali metal salt of dihydric phenol with a dihalobenzenoid compound in the presence of specific liquid organic sulfoxide or sulfone solvents under substantially anhydrous conditions. Catalyst are not necessary for this reaction but the unique facility of these solvents to promote the reaction to a high molecular weight product has now provided the critical tool necessary to secure sufficiently high molecular weight aromatic ether products useful for services heretofore limited to such products as polyformaldehydes and polycarbonates.

The polymers are also prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salt of the dihydric phenol is admixed and reacted with about stoichiometric quantities of the dihalobenzenoid or dinitrobenzenoid compound.

The polymerization reaction proceeds in the liquid phase of a sulfoxide or sulfone organic solvent at elevated temperatures.

A preferred form of the polyarylene polyethers of this invention are those prepared using the dihydric polynuclear phenols of the following four types, including the derivatives thereof which are substituted with inert substituent groups

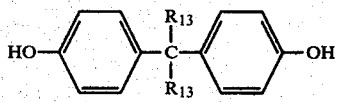
(a)

in which the $R_{13}$ group represents hydrogen, lower alkyl, lower aryl and the halogen substituted groups thereof, which can be the same or different.

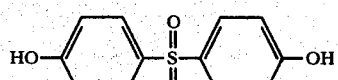
(b)

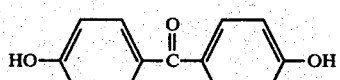
(c)

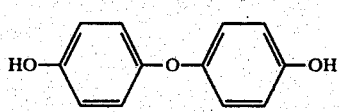
(d)

It is also contemplated in this invention to use a mixture of two or more different dihydric phenols to accomplish the same ends as above. Thus when referred to above the —E— residuum in the polymer structure can actually be the same or different aromatic residua.

In order to secure the high polymers, the system should be substantially anhydrous, and preferably with less than 0.5 percent by weight water in the reaction mixtures.

The poly(aryl ether)s have a reduced viscosity of from about 0.4 to about 1.5 as measured in an appropriate solvent at an appropriate temperature depending on the particular polyether, such as in methylene chloride at 25° C.

The preferred poly(aryl ether)s have repeating units of the formula:

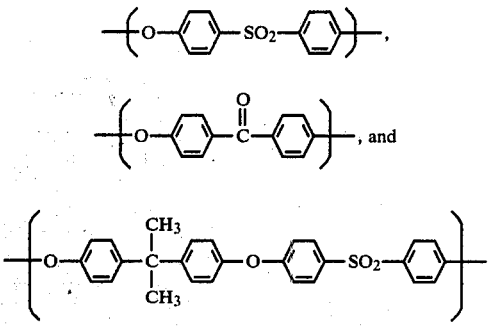

The polyarylate is used in amounts of from about 95 to about 5 preferably from about 80 to about 20 weight percent. The polyetherimide is used in amounts of from about 5 to about 95 preferably from about 20 to about 80 weight percent. The thermoplastic polymer when used, is used in amounts of from about 0 to about 40 preferably from about 0 to 25 weight percent.

The compositions of this invention are prepared by any conventional mixing methods. For example, a preferred method comprises mixing the polyarylate and the polyetherimide and optionally, thermoplastic polymer in powder or granular form in an extruder and extruding the mixture into strands, chopping the strands into pellets and molding the pellets into the desired article.

It should, of course, be obvious to those skilled in the art that other additives may be included in the present compositions. These additives include plasticizers; pigments; flame retardant additives, particularly, decabromodiphenyl ether and triarylphosphates, such as triphenylphosphate; reinforcing agents, such as glass fibers; thermal stabilizers; ultraviolet light stabilizers, processing aids, impact modifiers and the like.

EXAMPLES

The following examples serve to give specific illustrations of the practice of this invention but they are not intended in any way to limit the scope of this invention.

CONTROL A

Control A was a polyarylate (Ardel D-100, sold by Union Carbide Corporation and prepared from, Bisphenol-A and a mixture of 50 mole percent each terephthalic and isophthalic acid chlorides, by conventional methods) having a reduced viscosity of 0.66 as measured in p-chlorophenol at 49° C. (0.2 g/100 ml.).

The polyarylate was compression molded at 250° C. in a 4×4×0.020 inch cavity mold. ⅛ inch strips were shear cut from the molded product. These strips were tested for 1% secant modulus according to a procedure similar to ASTM-D-638; elongation at break according to ASTM D-638; pendulum impact strength. Also, samples were placed under the stress shown in the Table. A cotton swab saturated with the chemical environment, as identified in the Table, is attached to the center of the test specimen. The time for the specimen to rupture is then recorded. Additionally the clarity of the sample after molding was recorded.

The results are shown in Table I and II.

CONTROL B

Control B was a polyetherimide of the following formula:

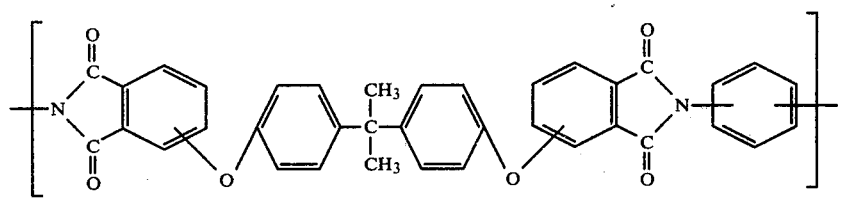

This polyetherimide had a reduced viscosity of 0.51 as measured in chloroform (0.5 gm per 100 ml) at 25° C.

The polyetherimide was compression molded and tested as described in Control A.

The results are shown in Tables I and II.

EXAMPLE 1

75 weight percent of the polyarylate of Control A was blended with 25 weight percent of the polyetherimide of Control B in a Brabender blender at about 300° C. The blend was compression molded and tested as described in Control A.

The results are shown in Tables I and II.

EXAMPLE 2

50 weight percent of the polyarylate of Control A was blended with 50 weight percent of the polyetherimide of Control B in a Brabender blender at about 300° C. The blend was compression molded and tested as described in Control A.

The results are shown in Tables I and II.

EXAMPLE 3

25 weight percent of the polyarylate of Control A was blended with 75 weight percent of the polyetherimide of Control B in a Brabender blender at about 300° C. The blend was compression molded and tested as described in Control A.

The results are shown in Tables I and II.

TABLE I

| Example | Description of the Composition[1] Polymer | Wt. % | Secant Modulus (psi) | Tensile Strength (psi) | Elongation at Break (%) | Pendulum Impact Strength (ft.-lbs./in.[3]) | Clarity After Molding |
|---|---|---|---|---|---|---|---|
| Control A | PA | 100 | 221,000 | 10,000 | 80 | 346 | Transparent |
| Control B | PEI | 100 | 332,000 | 15,200 | 8.7 | 13 | Transparent |
| 1 | PA | 75 | 244,000 | 9,900 | 12 | 172 | Opaque |
|  | PEI | 25 |  |  |  |  |  |
| 2 | PA | 50 | 265,000 | 11,700 | 20 | 143 | Translucent |
|  | PEI | 50 |  |  |  |  |  |
| 3 | PA | 25 | 297,000 | 12,400 | 10.5 | 89 | Transparent |
|  | PEI | 75 |  |  |  |  |  |

[1]PA = polyarylate
PEI = polyetherimide

TABLE II

| Example | Description of the Composition[1] Polymer | Wt. % | Chemical Environment | Stress (psi) | Time to Rupture (Sec.) |
|---|---|---|---|---|---|
| Control A | PA | 100 | Acetone | 500 | 1 |
| 1 | PA | 75 | Acetone | 500 | 7 |
|  | PEI | 25 |  |  |  |
| 2 | PA | 50 | Acetone | 500 | No rupture after 7200 sec. exposure |
|  | PEI | 50 |  |  |  |
| 3 | PA | 25 | Acetone | 1000 | No rupture after 7200 sec. exposure |
|  | PEI | 75 |  |  |  |
| Control A | PA | 100 | Methyl ethyl ketone | 500 | 2 |
| 1 | PA | 75 | Methyl ethyl ketone | 500 | 8 |
| 2 | PA | 50 | Methyl ethyl ketone | 500 | 22 |
|  | PEI | 50 |  |  |  |
| 3 | PA | 25 | Methyl ethyl ketone | 500 | 540 |
|  | PEI | 75 |  |  |  |
| Control A | PA | 100 | Toluene/Heptane[2] | 2000 | 75 |
| 1 | PA | 75 | Toluene/Heptane[2] | 2000 | 185 |
|  | PEI | 25 |  |  |  |
| 2 | PA | 50 | Toluene/Heptane[2] | 2000 | 225 |
|  | PEI | 50 |  |  |  |
| 3 | PA | 25 | Toluene/Heptane[2] | 2000 | 6,516 |

TABLE II-continued

| Example | Description of the Composition[1] Polymer | Wt. % | Chemical Environment | Stress (psi) | Time to Rupture (Sec.) |
|---|---|---|---|---|---|
| | PEI | 75 | | | |

[1]PA = polyarylate
PEI = polyetherimide
[2]The toluene/heptane mixture was 50/50 by volume.

EXAMPLE 4

30 weight percent of the polyarylate of Control A was blended with 50 weight percent of the polyetherimide of Control B and 20 weight percent of a poly(ethylene terephthalate) having an intrinsic viscosity of 0.64 as measured in 60:40 phenol/tetrachloroethane mixture at 23° C. in a Brabender blender at about 300° C. The blend was compression molded at 300° C. in a 4×4×0.020 inch cavity mold. ⅛ inch strips were shear cut from the molded product. These strips were tested for tensile modulus and tensile strength according to a procedure similar to ASTM D-638; elongation at break according to a procedure similar to ASTM D-638 and pendulum impact strength. Additionally, the clarity after molding was recorded.

The results are shown in Table III.

EXAMPLE 5

15 weight percent of the polyarylate of Control A was blended with 75 weight percent of the polyetherimide of Control B and 10 weight percent of the poly(ethylene terephthalate) of Example 4 in a Brabender blender at about 300° C. The blend was compression molded and tested as described in Example 4.

The results are shown in Table III.

EXAMPLE 6

25 weight percent of the polyarylate of Control A was blended with 50 weight percent of the polyetherimide of Control B and 25 weight percent of a polycarbonate (Lexan 143) having a reduced viscosity of 0.57 as measured in chloroform at 25° C. (0.5 gr. per 100 ml). The blend was compression molded and tested as described in Example 4.

The results are shown in Table III.

TABLE III

| Example | Description of the Composition[1] Polymer | Wt. % | Modulus (psi) | Strength (psi) | Elongation at break (%) | Pendulum Impact Strength (ft.-lbs./in.³) | Clarity After Molding |
|---|---|---|---|---|---|---|---|
| 4 | PA | 30 | 295,000 | 12,000 | 7.3 | 84 | Transparent |
| | PEI | 50 | | | | | |
| | PET | 20 | | | | | |
| 5 | PA | 15 | 310,000 | 13,900 | 9 | 14 | Transparent |
| | PEI | 75 | | | | | |
| | PET | 10 | | | | | |
| 6 | PA | 25 | 282,000 | 11,000 | 13 | 206 | Opaque |
| | PEI | 50 | | | | | |
| | PC | 25 | | | | | |

[1]PA = polyarylate
PEI = polyetherimide
PET = poly(ethylene terephthalate)
PC = polycarbonate

What is claimed is:

1. A molding composition comprising a blend of:
   (a) a polyarylate derived from at least one dihydric phenol and at least one aromatic dicarboxylic acid; and
   (b) a polyetherimide.

2. A composition as defined in claim 1 wherein the dihydric phenol is of the formula:

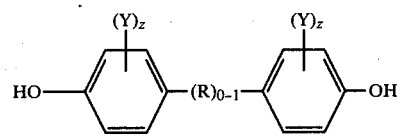

wherein Y is independently selected from alkyl groups of 1 to 4 carbon atoms, cycloalkyl groups of 6 to 12 carbon atoms, aryl groups of 6 to 20 carbon atoms, chlorine or bromine, z independently has a value from 0 to 4, inclusive, and R is a divalent saturated aliphatic or aromatic hydrocarbon radical selected from alkylene and alkylidene radicals having from 1 to 8 carbon atoms, cycloalkylene and cycloalkylidene radicals having up to and including 9 carbon atoms and arylene radicals having from 6 to 20 carbon atoms.

3. A composition as defined in claim 2 wherein each z is 0 and R is an alkylidene radical of 3 carbon atoms.

4. A composition as in claim 1 wherein the aromatic dicarboxylic acid in (a) is selected from terephthalic or isophthalic acids, or mixtures thereof.

5. A composition as defined in claim 1 wherein the polyetherimide is of the following formula:

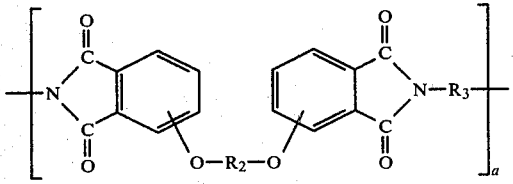

wherein a is an integer greater than 1, preferably from about 10 to about 10,000 or more, —O—R₂—O— is attached to the 3 or 4 and 3' or 4' positions and R₂ is selected from (a) a substituted or unsubstituted aromatic radical such as

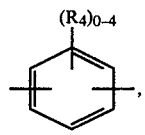

(b) a divalent radical of the formula:

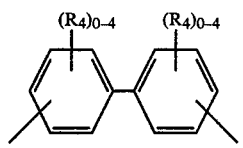

wherein $R_4$ is independently $C_1$ to $C_6$ alkyl, or halogen and $R_5$ is selected from —O—, —S—,

—$SO_2$—, —SO—, alkylene of 1 to 6 carbon atoms, cycloalkylene of 4 to 8 carbon atoms and alkylidene of 1 to 6 carbon atoms or cycloalkylidene of 4 to 8 carbon atoms; $R_3$ is selected from an aromatic hydrocarbon radical having from 6 to 20 carbon atoms and halogenated derivatives thereof or alkyl substituted derivatives thereof wherein the alkyl group contains 1 to 6 carbon atoms, alkylene and cycloalkylene radicals having from 2 to 20 carbon atoms, $C_2$-$C_8$ alkylene terminated polydiorganosiloxane and a divalent radical of the formula

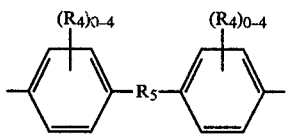

wherein $R_4$ and $R_5$ are as previously defined and wherein $R_5$ may be a direct bond.

6. A composition as defined in claim 1 wherein the polyetherimide is of the following formula:

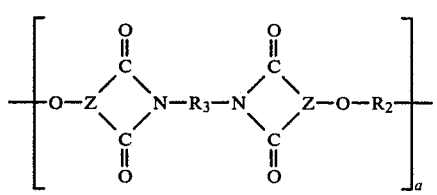

wherein

is a member selected from

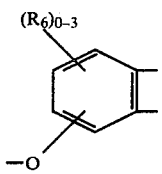 (a)

wherein $R_6$ is independently hydrogen, lower alkyl or lower alkoxy

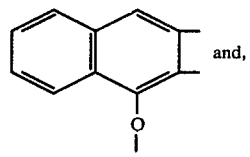 (b)

and,

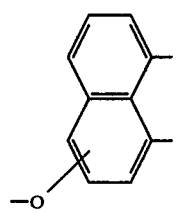 (c)

wherein the oxygen may be attached to either ring and located ortho or para to one of the bonds to the anhydride carbonyl group, a is an integer greater than 1, preferably from about 10 to about 10,000 or more, $R_2$ is selected from (a) a substituted or unsubstituted aromatic radical such as

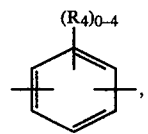

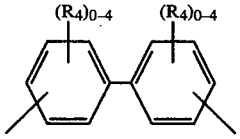

(b) a divalent radical of the formula:

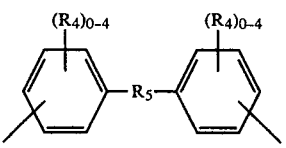

wherein $R_4$ is independently $C_1$ to $C_6$ alkyl, or halogen and $R_5$ is selected from —O—, —S—,

—SO$_2$—, —SO—, alkylene of 1 to 6 carbon atoms, cycloalkylene of 4 to 8 carbon atoms and alkylidene of 1 to 6 carbon atoms or cycloalkylidene of 4 to 8 carbon atoms; R$_3$ is selected from an aromatic hydrocarbon radical having from 6 to 20 carbon atoms and halogenated derivatives thereof or alkyl substituted derivatives thereof wherein the alkyl group contains 1 to 6 carbon atoms, alkylene and cycloalkylene radicals having from 2 to 20 carbon atoms, C$_2$–C$_8$ alkylene terminated polydiorganosiloxane and a divalent radical of the formula

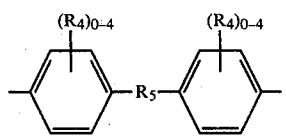

wherein R$_4$ and R$_5$ are as previously defined and wherein R$_5$ may be a direct bond.

7. A composition as in claims 1, 5, or 6 wherein the polyetherimide is of the following formula:

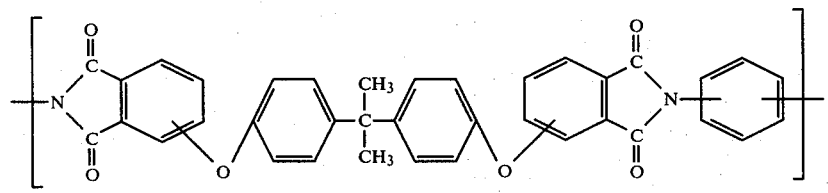

8. A composition as in claim 1 which contains a thermoplastic polymer which is compatible with the blend of polyarylate and polyetherimide.

9. A composition as in claim 8 wherein the thermoplastic polymer is at least one of a polyester, a polycarbonate or poly(aryl ether).

10. A composition as defined in claims 9 wherein the polyester is derived from an aliphatic diol and an aromatic dicarboxylic acid having repeating units of the following general formula:

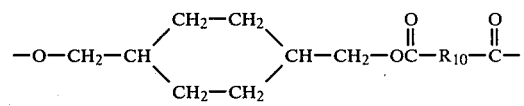

11. A composition as defined in claim 9 or 10 wherein the polyester is poly(ethylene terephthalate).

12. A composition as defined in claim 9 where the polyester is derived from a cycloaliphatic diol and an aromatic dicarboxylic acid and has repeating units of the general formula:

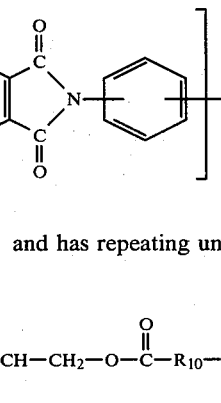

wherein the cyclohexane ring is selected from the group consisting of the cis- and trans-isomers thereof and R$_{10}$ represents an aryl radical containing from 6 to 20 carbon atoms which is the decarboxylated residue derived from an aromatic dicarboxylic acid.

13. A composition as defined in claim 9 wherein the polyester is derived from a mixture of an aliphatic diol, a cycloaliphatic diol and an aromatic dicarboxylic acid and has repeating units of the general formula:

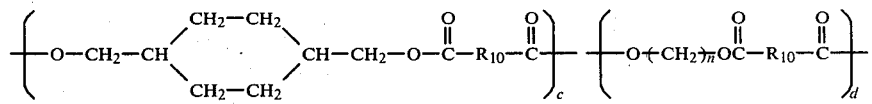

wherein the cyclohexane ring is selected from the group consisting of the cis- and trans-isomers thereof, R$_{10}$ represents an aryl radical containing from 6 to 20 carbon atoms which is the decarboxylated residue derived from an aromatic dicarboxylic acid, n is an integer of 2 to 4, c units comprise from about 10 to about 90 percent by weight and d units comprise from about 10 to about 90 percent by weight.

14. A composition as defined in claim 13 wherein the polyester has repeating units of the general formula:

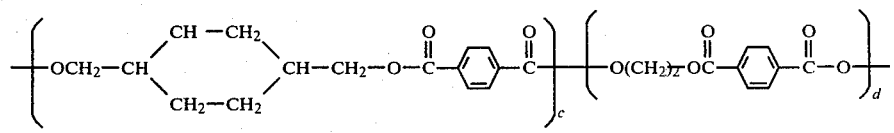

15. A composition as defined in claim 9 wherein the polycarbonate is the reaction product of a dihydric phenol and a carbonate precursor.

16. A composition as defined in claims 9 or 15 wherein the dihydric phenol is bisphenol-A and the carbonate precursor is carbonyl chloride.

17. A composition as defined in claim 9 wherein the poly(aryl ether) is composed of recurring units of the formula:

O—E—O—E'— wherein E is the residuum of a dihydric phenol and E' is the residuum of a benzoid compound having an inert electron withdrawing group.

18. A composition as defined in claim 9 or 17 wherein the poly(aryl ether) has repeating units of the formula:

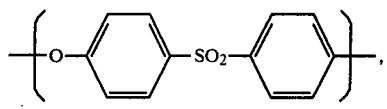

19. A composition as defined in claim 9 or 17 wherein the poly(aryl ether) has repeating units of the formula:

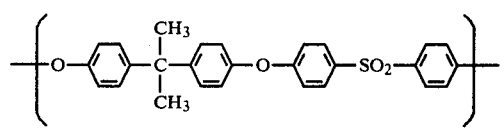

20. A composition as defined in claim 9 or 17 wherein the poly(aryl ether) has repeating units of the formula:

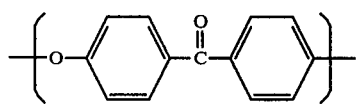

* * * * *